US011064460B2

(12) United States Patent
Chen et al.

(10) Patent No.: US 11,064,460 B2
(45) Date of Patent: Jul. 13, 2021

(54) METHOD AND DEVICE IN UE AND BASE STATION FOR WIRELESS COMMUNICATION

(71) Applicants: JinHui Chen, Shanghai (CN); XiaoBo Zhang, Shanghai (CN); Lin Yang, Shanghai (CN)

(72) Inventors: JinHui Chen, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 200 days.

(21) Appl. No.: 16/515,042

(22) Filed: Jul. 18, 2019

(65) Prior Publication Data
US 2020/0029306 A1    Jan. 23, 2020

(30) Foreign Application Priority Data
Jul. 20, 2018    (CN) .......................... 201810799906.2

(51) Int. Cl.
*H04W 72/02*    (2009.01)
*H04W 72/04*    (2009.01)
*H04W 72/12*    (2009.01)
*H04B 7/08*    (2006.01)
*H04W 56/00*    (2009.01)

(52) U.S. Cl.
CPC .............. *H04W 72/02* (2013.01); *H04B 7/08* (2013.01); *H04W 56/001* (2013.01);
(Continued)

(58) Field of Classification Search
CPC ............. H04W 72/0406; H04W 72/02; H04W 72/046; H04W 72/1289; H04W 72/1205;
(Continued)

(56) References Cited

U.S. PATENT DOCUMENTS

2017/0295601 A1* 10/2017 Kim .................. H04W 72/0406
2020/0328779 A1* 10/2020 Sun ........................ H04B 7/088

FOREIGN PATENT DOCUMENTS

| CN | 106162851 A | 11/2016 |
|----|-------------|---------|
| CN | 106507486 A | 3/2017  |

(Continued)

OTHER PUBLICATIONS

Second Office Action received from the No. CN201810799906.2 dated Nov. 4, 2020.
(Continued)

*Primary Examiner* — Vinncelas Louis

(57) ABSTRACT

The disclosure provides a method and a device in a User Equipment (UE) and a base station for wireless communication. The UE receives a first signaling for indicating a first time-frequency resource pool and a first spatial parameter group and a second signaling for indicating a second spatial parameter group in turn, the first spatial parameter group being associated to the first time-frequency resource pool including a first time-frequency resource set; the UE judges whether the first time-frequency resource set can transmit a radio signal; if so, the UE transmits a first radio signal in the first time-frequency resource set; otherwise, the UE gives up transmitting a radio signal in the first time-frequency resource set; the first spatial parameter group and the second spatial parameter group judge whether the first time-frequency resource set can transmit a radio signal. The disclosure improves efficiency of configured grant uplink transmission.

20 Claims, 8 Drawing Sheets

(52) U.S. Cl.
CPC ..... *H04W 72/046* (2013.01); *H04W 72/1205* (2013.01); *H04W 72/1268* (2013.01); *H04W 72/1289* (2013.01)

(58) Field of Classification Search
CPC .......... H04W 56/001; H04W 72/1268; H04W 74/006; H04W 74/0808; H04W 76/27; H04W 72/044; H04W 72/1278; H04B 7/088; H04B 7/0691; H04B 7/08; H04B 7/0695; H04B 7/0456
See application file for complete search history.

(56) References Cited

FOREIGN PATENT DOCUMENTS

| | | | |
|---|---|---|---|
| CN | 106507497 A | 3/2017 | |
| CN | 107454645 A | 12/2017 | |
| CN | 107534968 A | 1/2018 | |
| CN | 108029085 A | 5/2018 | |
| CN | 108111276 A | 6/2018 | |
| WO | 2015062090 A1 | 5/2015 | |
| WO | 2018090861 A1 | 5/2018 | |
| WO | 2018127201 A1 | 7/2018 | |

OTHER PUBLICATIONS

Search Report of the CN Patent No. 201810799906.2 dated Jul. 21, 2020.

1st Office Action of the CN Patent No. 201810799906.2 dated Jul. 31, 2020.

3GPP TSG RAN WG1 Meeting #86:R1-166403 ZTE etc Grant-free Multiple Access Schemes for mMTC.

* cited by examiner

METHOD AND DEVICE IN UE AND BASE STATION FOR WIRELESS COMMUNICATION

CROSS-REFERENCE TO RELATED APPLICATION

This application claims the priority benefit of Chinese Patent Application Serial Number 201810799906.2, filed on Jul. 20, 2018, the full disclosure of which is incorporated herein by reference.

BACKGROUND

Technical Field

The disclosure relates to transmission methods and devices in wireless communication systems, and in particular to a method and a device of multi-antenna transmission technologies.

Related Art

Massive Multi-Input Multi-Output (MIMO) becomes a research hotspot of next-generation mobile communications. In the massive MIMO, multiple antennas experience beamforming to form a relatively narrow beam which points to a particular direction to improve quality of communication.

In conventional 3rd Generation Partner Project (3GPP) Long-term Evolution (LTE) systems, uplink transmission on terminal side generally is based on a dynamic grant of a base station. However, in 5G New Radio Access Technology (NR) Phase 1, a terminal can perform configured grant uplink transmission in air-interface resources preconfigured by a base station, so as to reduce overheads of air-interface signalings and improve spectrum efficiency of the system. In a configured grant, a base station configures, for a User Equipment (UE), a resource pool and multi-antenna related information for uplink precoding through a higher-layer signaling, for example, Radio Resource Control (RRC) signaling, and the UE determines autonomously whether to transmit a radio signal in the resource pool configured by the base station.

SUMMARY

The inventor finds through researches that the multi-antenna related information for uplink precoding configured for the UE by the base station through a higher-layer signaling would have a problem of being inapplicable to some one time window in one periodicity because the periodicity is long.

In view of the above problems, the disclosure provides a solution. It should be noted that the embodiments of the disclosure and the characteristics in the embodiments may be mutually combined arbitrarily if no conflict is incurred. For example, the embodiments of the UE of the disclosure and the characteristics in the embodiments may be applied to the base station, and vice versa.

The disclosure provides a method in a UE for wireless communication, wherein the method includes:

receiving a first signaling, the first signaling being used for indicating a first time-frequency resource pool and a first spatial parameter group, the first spatial parameter group being associated to the first time-frequency resource pool, and the first time-frequency resource pool including a first time-frequency resource set;

receiving a second signaling, the second signaling being used for indicating a second spatial parameter group; and judging whether the first time-frequency resource set can be used for transmitting a radio signal; if so, transmitting a first radio signal in the first time-frequency resource set, an antenna port used for transmitting the first radio signal being related to the first spatial parameter group; otherwise, giving up transmitting a radio signal in the first time-frequency resource set.

Herein, the first spatial parameter group and the second spatial parameter group are used for judging whether the first time-frequency resource set can be used for transmitting a radio signal.

In one embodiment, the above method solves the problem that: if according to a dynamic signaling, the UE can still perform uplink transmission in preconfigured resources employing a previous precoding configured through an RRC signaling in the condition of judging that the previous precoding is no longer applicable, which would result in problems of poor uplink performance, intra-user interference and power waste.

In one embodiment, the above method has a following benefit: it can be judged, according to a dynamic signaling, whether to transmit a radio signal in preconfigured radio resources employing multi-antenna related information configured through a higher-layer signaling, which improves efficiency of transmission.

Specifically, according to one aspect of the disclosure, the method includes:

transmitting a second radio signal in a second time-frequency resource set, an antenna port used for transmitting the second radio signal being related to the second spatial parameter group, and time-frequency resources in the second time-frequency resource set not belonging to the first time-frequency resource pool.

Herein, the second signaling includes scheduling information of the second radio signal.

In one embodiment, the above method has a following benefit: multi-antenna related information transmitted in uplink used for dynamic grant is used for judging whether to transmit a radio signal in radio resources preconfigured through an RRC signaling employing multi-antenna related information configured through a higher-layer signaling, which saves signaling overheads and improves efficiency of transmission.

Specifically, according to one aspect of the disclosure, the first time-frequency resource set is within a first time window, and a reception time point of the second signaling is used for determining an end time point of the first time window.

In one embodiment, the above method has a following benefit: by setting up an effective time window, opportunities and delay of transmission are guaranteed.

Specifically, according to one aspect of the disclosure, the first signaling is a higher-layer signaling, and the second signaling is a physical layer signaling.

Specifically, according to one aspect of the disclosure, the first signaling is used for indicating a first spatial parameter group set associated with the first spatial parameter group; if the first spatial parameter group set includes the second spatial parameter group, the UE judges that the first time-frequency resource set can be used for transmitting a radio signal; if the first spatial parameter group set does not include the second spatial parameter group, the UE judges that the first time-frequency resource set cannot be used for transmitting a radio signal.

In one embodiment, the above method has a following benefit: a base station configures judgment criteria, thereby improving flexibility of the system.

Specifically, according to one aspect of the disclosure, the UE determines autonomously whether to transmit a radio signal in time-frequency resources in the first time-frequency resource pool.

In one embodiment, the above method has a following benefit: the method in the disclosure is used for configured grant or grant-free communications, which improves quality of communication.

Specifically, according to one aspect of the disclosure, the first spatial parameter group and the second spatial parameter group are associated with a first reference signal resource and a second reference signal resource respectively.

Specifically, according to one aspect of the disclosure, the first spatial parameter group is associated with a first synchronization signal time index, the second spatial parameter group is associated with a second synchronization signal time index; and a relationship between the first synchronization signal time index and the second synchronization signal time index is used for judging whether the first time-frequency resource set can be used for transmitting a radio signal.

In one embodiment, the above method has a following benefit: whether the first time-frequency resource set can be used for transmitting a radio signal is judged through a judgment of differences between beams used for receiving different synchronization signals, which increases opportunities of uplink transmission in configured grant radio resources.

Specifically, according to one aspect of the disclosure, a physical downlink shared channel is used for transmitting the first signaling, and a physical downlink control channel is used for transmitting the second signaling.

The disclosure provides a method in a base station for wireless communication, wherein the method includes:

transmitting a first signaling, the first signaling being used for indicating a first time-frequency resource pool and a first spatial parameter group, the first spatial parameter group being associated to the first time-frequency resource pool, and the first time-frequency resource pool including a first time-frequency resource set;

transmitting a second signaling, the second signaling being used for indicating a second spatial parameter group; and monitoring a first radio signal in the first time-frequency resource set, or, giving up monitoring a radio signal in the first time-frequency resource set.

Herein, the first spatial parameter group and the second spatial parameter group are used for indicating whether the first time-frequency resource set can be used for transmitting a radio signal.

Specifically, according to one aspect of the disclosure, the method includes:

receiving a second radio signal in a second time-frequency resource set, an antenna port used for transmitting the second radio signal being related to the second spatial parameter group, and time-frequency resources in the second time-frequency resource set not belonging to the first time-frequency resource pool.

Herein, the second signaling includes scheduling information of the second radio signal.

Specifically, according to one aspect of the disclosure, the first time-frequency resource set is within a first time window, and a reception time point of the second signaling is used for determining an end time point of the first time window.

Specifically, according to one aspect of the disclosure, the first signaling is a higher-layer signaling, and the second signaling is a physical layer signaling.

Specifically, according to one aspect of the disclosure, the first signaling is used for indicating a first spatial parameter group set associated with the first spatial parameter group; if the first spatial parameter group set includes the second spatial parameter group, the first time-frequency resource set can be used for transmitting a radio signal; if the first spatial parameter group set does not include the second spatial parameter group, the first time-frequency resource set cannot be used for transmitting a radio signal.

Specifically, according to one aspect of the disclosure, a receiver of the first signaling determines autonomously whether to transmit a radio signal in time-frequency resources in the first time-frequency resource pool.

Specifically, according to one aspect of the disclosure, the first spatial parameter group and the second spatial parameter group are associated with a first reference signal resource and a second reference signal resource respectively.

Specifically, according to one aspect of the disclosure, the first spatial parameter group is associated with a first synchronization signal time index, the second spatial parameter group is associated with a second synchronization signal time index, and a relationship between the first synchronization signal time index and the second synchronization signal time index is used for judging whether the first time-frequency resource set can be used for transmitting a radio signal.

Specifically, according to one aspect of the disclosure, a physical downlink shared channel is used for transmitting the first signaling, and a physical downlink control channel is used for transmitting the second signaling.

The disclosure provides a UE for wireless communication, wherein the UE includes:

a first receiver, to receive a first signaling, the first signaling being used for indicating a first time-frequency resource pool and a first spatial parameter group, the first spatial parameter group being associated to the first time-frequency resource pool, and the first time-frequency resource pool including a first time-frequency resource set;

a second receiver, to receive a second signaling, the second signaling being used for indicating a second spatial parameter group; and a third transmitter, to judge whether the first time-frequency resource set can be used for transmitting a radio signal; if so, to transmit a first radio signal in the first time-frequency resource set, an antenna port used for transmitting the first radio signal being related to the first spatial parameter group; otherwise, to give up transmitting a first radio signal in the first time-frequency resource set.

Herein, the first spatial parameter group and the second spatial parameter group are used for judging whether the first time-frequency resource set can be used for transmitting a radio signal.

In one embodiment, the above UE is characterized in that: the third transmitter transmits a second radio signal in a second time-frequency resource set, an antenna port used for transmitting the second radio signal is related to the second spatial parameter group, and time-frequency resources in the second time-frequency resource set do not belong to the first time-frequency resource pool, wherein the second signaling includes scheduling information of the second radio signal.

In one embodiment, the above UE is characterized in that: the first time-frequency resource set is within a first time window, and a reception time point of the second signaling is used for determining an end time point of the first time window.

In one embodiment, the above UE is characterized in that: the first signaling is a higher-layer signaling, and the second signaling is a physical layer signaling.

In one embodiment, the above UE is characterized in that: the first signaling is used for indicating a first spatial parameter group set associated with the first spatial parameter group; if the first spatial parameter group set includes the second spatial parameter group, the UE judges that the first time-frequency resource set can be used for transmitting a radio signal; if the first spatial parameter group set does not include the second spatial parameter group, the UE judges that the first time-frequency resource set cannot be used for transmitting a radio signal.

In one embodiment, the above UE is characterized in that: the UE determines autonomously whether to transmit a radio signal in time-frequency resources in the first time-frequency resource pool.

In one embodiment, the above UE is characterized in that: the first spatial parameter group and the second spatial parameter group are associated with a first reference signal resource and a second reference signal resource respectively.

In one embodiment, the above UE is characterized in that: the first spatial parameter group is associated with a first synchronization signal time index, the second spatial parameter group is associated with a second synchronization signal time index, and a relationship between the first synchronization signal time index and the second synchronization signal time index is used for judging whether the first time-frequency resource set can be used for transmitting a radio signal.

In one embodiment, the above UE is characterized in that: a physical downlink shared channel is used for transmitting the first signaling, and a physical downlink control channel is used for transmitting the second signaling.

The disclosure provides a base station for wireless communication, wherein the base station includes:

a first transmitter, to transmit a first signaling, the first signaling being used for indicating a first time-frequency resource pool and a first spatial parameter group, the first spatial parameter group being associated to the first time-frequency resource pool, and the first time-frequency resource pool including a first time-frequency resource set;

a second transmitter, to transmit a second signaling, the second signaling being used for indicating a second spatial parameter group; and a third receiver, to monitor a first radio signal in the first time-frequency resource set, or, to give up monitoring a first radio signal in the first time-frequency resource set.

Herein, the first spatial parameter group and the second spatial parameter group are used for indicating whether the first time-frequency resource set can be used for transmitting a radio signal.

In one embodiment, the above base station is characterized in that: the third receiver receives a second radio signal in a second time-frequency resource set, an antenna port used for transmitting the second radio signal is related to the second spatial parameter group, and time-frequency resources in the second time-frequency resource set do not belong to the first time-frequency resource pool, wherein the second signaling includes scheduling information of the second radio signal.

In one embodiment, the above base station is characterized in that: the first time-frequency resource set is within a first time window, and a reception time point of the second signaling is used for determining an end time point of the first time window.

In one embodiment, the above base station is characterized in that: the first signaling is a higher-layer signaling, and the second signaling is a physical layer signaling.

In one embodiment, the above base station is characterized in that: the first signaling is used for indicating a first spatial parameter group set associated with the first spatial parameter group; if the first spatial parameter group set includes the second spatial parameter group, the first time-frequency resource set can be used for transmitting a radio signal; if the first spatial parameter group set does not include the second spatial parameter group, the first time-frequency resource set cannot be used for transmitting a radio signal.

In one embodiment, the above base station is characterized in that: a receiver of the first signaling determines autonomously whether to transmit a radio signal in time-frequency resources in the first time-frequency resource pool.

In one embodiment, the above base station is characterized in that: the first spatial parameter group and the second spatial parameter group are associated with a first reference signal resource and a second reference signal resource respectively.

In one embodiment, the above base station is characterized in that: the first spatial parameter group is associated with a first synchronization signal time index, the second spatial parameter group is associated with a second synchronization signal time index, and a relationship between the first synchronization signal time index and the second synchronization signal time index is used for judging whether the first time-frequency resource set can be used for transmitting a radio signal.

In one embodiment, the above base station is characterized in that: a physical downlink shared channel is used for transmitting the first signaling, and a physical downlink control channel is used for transmitting the second signaling.

In one embodiment, compared with conventional schemes, the disclosure has the following advantages.

It can be judged, according to a dynamic signaling, whether to transmit a radio signal in preconfigured radio resources employing multi-antenna related information configured through a higher-layer signaling, which improves efficiency of transmission.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is caused.

Embodiment 1

Figure 1:
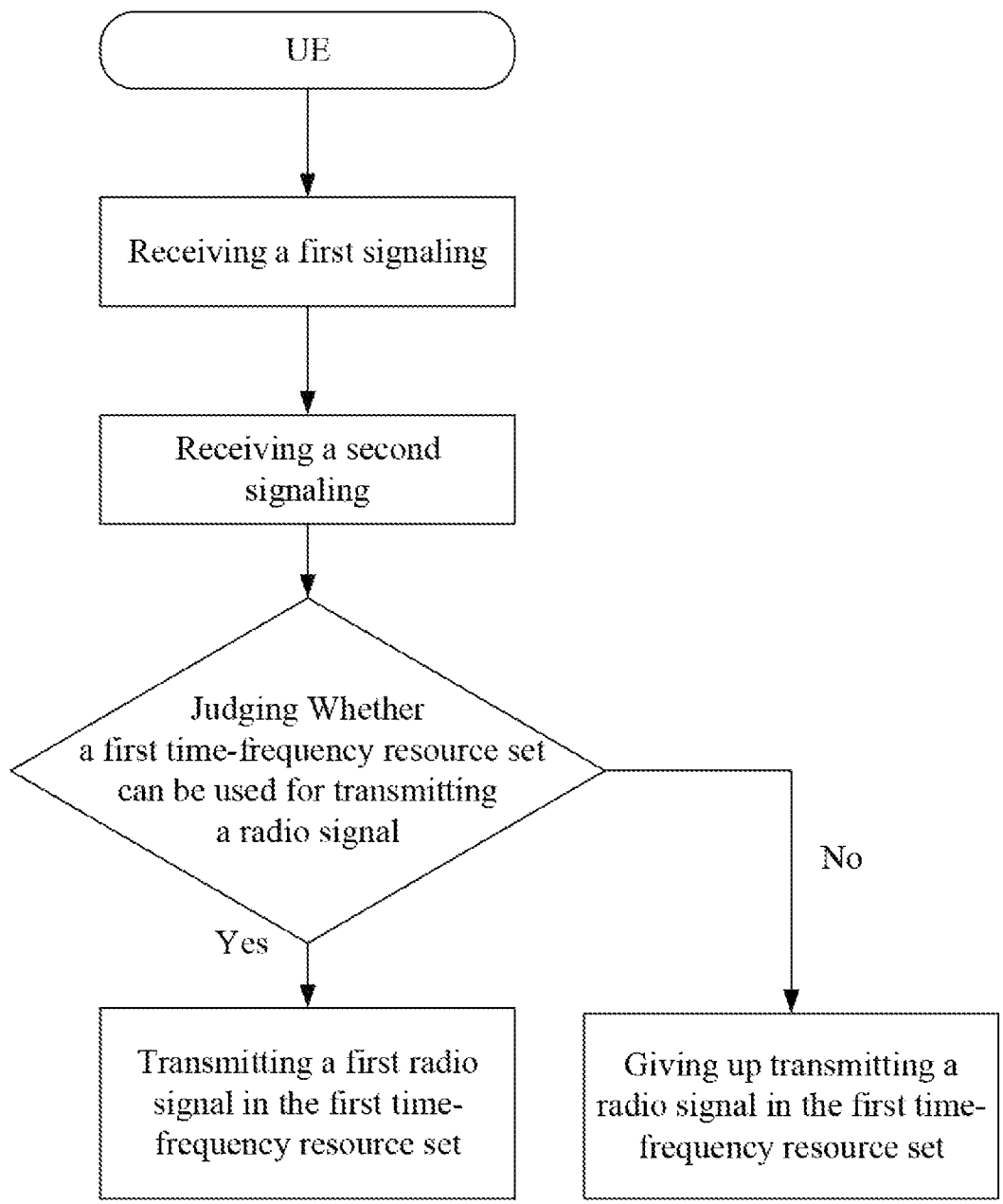
FIG. 1 is a flowchart of a first signaling and a second signaling according to one embodiment of the disclosure.

Embodiment 1 illustrates an example of a flowchart, as shown in FIG. 1.

In Embodiment 1, the UE in the disclosure, in turn, receives a first signaling, the first signaling being used for indicating a first time-frequency resource pool and a first spatial parameter group, the first spatial parameter group being associated to the first time-frequency resource pool, and the first time-frequency resource pool including a first time-frequency resource set; receives a second signaling, the second signaling being used for indicating a second spatial parameter group; judges whether the first time-frequency resource set can be used for transmitting a radio signal; if so, transmits a first radio signal in the first time-frequency resource set, an antenna port used for transmitting the first radio signal being related to the first spatial parameter group; otherwise, gives up transmitting a radio signal in the first time-frequency resource set; wherein the first spatial parameter group and the second spatial parameter group are used for judging whether the first time-frequency resource set can be used for transmitting a radio signal.

In one subembodiment, the first time-frequency resource pool is reserved to grant-free transmission.

In one subembodiment, the first time-frequency resource pool is reserved to configured grant transmission.

In one subembodiment, the antenna port used for transmitting the first radio signal is unrelated to the second spatial parameter group.

In one subembodiment, the action of giving up radio transmission in the first time-frequency resource pool includes: delaying transmission of information carried by the first radio signal.

In one subembodiment, the action of giving up transmission in the first time-frequency resource pool includes: dropping information carried by the first radio signal.

In one subembodiment, the action of giving up radio transmission in the first time-frequency resource pool includes: puncturing on all Resource Elements (REs) included in the first time-frequency resource pool.

In one subembodiment, the phrase that the first spatial parameter group being associated to the first time-frequency resource pool includes: a precoder generated according to the first spatial parameter group is used by the UE to transmit a radio signal in the first time-frequency resource pool.

In one subembodiment, the phrase that the first spatial parameter group being associated to the first time-frequency resource pool includes: a transmitting beam generated according to the first spatial parameter group is used by the UE to transmit a radio signal in the first time-frequency resource pool.

In one subembodiment, the phrase that the first spatial parameter group being associated to the first time-frequency resource pool includes: the first spatial parameter group is used for determining that radio signals transmitted by the UE in the first time-frequency resource pool are all Quasi-Colocated (QCLed) in space.

In one subembodiment, the phrase that the first spatial parameter group being associated to the first time-frequency resource pool includes: the first spatial parameter group is used for determining that a same receiving beam can be used for receiving radio signals transmitted in the first time-frequency resource pool.

In one subembodiment, the phrase that two radio signals are QCLed in space refers that a spatial parameter group used for receiving one radio signal is used to deduce and obtain a spatial parameter group used for receiving the other radio signal.

In one subembodiment, the phrase that two radio signals are QCLed in space refers that a receiving beam used for receiving one radio signal is used to deduce and obtain a receiving beam used for receiving the other radio signal.

In one subembodiment, the phrase that two radio signals are QCLed in space refers that a receiving beam used for receiving one radio signal is the receiving beam used for receiving the other radio signal.

In one subembodiment, the phrase that two radio signals are QCLed in space includes: channels experienced by two radio signals have same large-scale characteristics.

In one subembodiment, an antenna port used for transmitting a PDCCH in a first control resource set is QCLed to an antenna port used for transmitting a first reference signal group, and the QCL type is QCL Type D in 3GPP TS38.211.

In one subembodiment, the phrase that an antenna port used for transmitting the first radio signal being related to the first spatial parameter group includes: the first spatial parameter group is used for transmitting the first radio signal.

In one subembodiment, the phrase that an antenna port used for transmitting the first radio signal being related to the first spatial parameter group includes: the first spatial parameter group is used for generating a precoder transmitting the first radio signal.

In one subembodiment, the phrase that an antenna port used for transmitting the first radio signal being related to the first spatial parameter group includes: the first spatial parameter group is used for generating an analog beam transmitting the first radio signal.

In one subembodiment, the first signaling is an RRC signaling.

In one subembodiment a Physical Downlink Shared Channel (PDSCH) is used for transmitting the first signaling.

In one subembodiment, an uplink reference signal resource indicator is used for determining the first spatial parameter group.

In one subembodiment, a Sounding Reference Signal (SRS) resource indicator is used for determining the first spatial parameter group.

In one subembodiment, a downlink reference signal resource indicator is used for determining the first spatial parameter group.

In one subembodiment, a Channel State Information Reference Signal (CSI-RS) indicator is used for determining the first spatial parameter group.

In one subembodiment, time-frequency resources in the first time-frequency resource pool occur periodically.

In one subembodiment, the second signaling is Downlink Control Information (DCI).

In one subembodiment, a Physical Downlink Control Channel (PDCCH) is used for transmitting the second signaling.

In one subembodiment, a first receiving beam is used for receiving a radio signal transmitted employing the first spatial parameter group, and a second receiving beam is used for receiving a radio signal transmitted employing the second spatial parameter group; if the first receiving beam can be used for receiving the radio signal transmitted employing the second spatial parameter group, the UE judges that the first time-frequency resource set can be used for transmitting a radio signal; if the first receiving beam cannot be used for receiving the radio signal transmitted employing the second spatial parameter group, the UE judges that the first time-frequency resource cannot be used for transmitting a radio signal.

In one subembodiment, if an angular coverage of the first receiving beam includes an angular coverage of the second receiving beam, the UE judges that the first time-frequency resource set can be used for transmitting a radio signal; if the angular coverage of the first receiving beam does not include the angular coverage of the second receiving beam, the UE judges that the first time-frequency resource set cannot be used for transmitting a radio signal.

In one subembodiment, the first spatial parameter group is used for generating a first transmitting beam, and the second spatial parameter group is used for generating a second transmitting beam; if an angular coverage of the first transmitting beam includes an angular coverage of the second transmitting beam, the UE judges that the first time-frequency resource set can be used for transmitting a radio signal; if the angular coverage of the first transmitting beam does not include the angular coverage of the second transmitting beam, the UE judges that the first time-frequency resource set cannot be used for transmitting a radio signal.

In one subembodiment, the first spatial parameter group and the second spatial parameter group are used for generating a first precoding vector and a second precoding vector respectively; if an inner product of the first precoding vector and the second precoding vector is greater than a first threshold, the UE judges that the first time-frequency resource set can be used for transmitting a radio signal; if the inner product of the first precoding vector and the second precoding vector is not greater than the first threshold, the UE judges that the first time-frequency resource set cannot be used for transmitting a radio signal.

In one subembodiment, the first threshold is configured by a base station.

In one subembodiment, the first threshold is determined by default.

In one subembodiment, the first radio signal is an Orthogonal Frequency Division Multiplexing (OFDM) symbol.

In one subembodiment, the first radio signal is a Discrete Fourier Transform Spread OFDM (DFT-S-OFDM) symbol.

In one subembodiment, a Physical Uplink Shared Channel (PUSCH) is used for transmitting the first radio signal.

In one subembodiment, the UE transmits a second radio signal in a second time-frequency resource set, an antenna port used for transmitting the second radio signal is related to the second spatial parameter group, and time-frequency resources in the second time-frequency resource set do not belonging to the first time-frequency resource pool; wherein the second signaling includes scheduling information of the second radio signal.

In one subembodiment, the scheduling information includes at least one of an indicator regarding the second time-frequency resource set, an antenna port used for transmitting the second radio signal, a modulation mode used for generating the second radio signal, and a coding rate used for generating the second radio signal.

In one subembodiment, a PUSCH is used for transmitting the second radio signal.

In one subembodiment, the first time-frequency resource set is orthogonal to the first time-frequency resource pool.

In one subembodiment, the second time-frequency resource set is used for dynamic grant transmission of a radio signal.

In one subembodiment, the first time-frequency resource set is within a first time window, and a reception time point of the second signaling is used for determining an end time point of the first time window.

In one subembodiment, a deviation between a subframe in which a reception time point of the second signaling is located and a subframe in which a start time point of the first time window is located is determined by default.

In one subembodiment, a deviation between a subframe in which a reception time point of the second signaling is located and a subframe in which a start time point of the first time window is located is configured by a base station.

In one subembodiment, a length of the first time window is determined by default.

In one subembodiment, a length of the first time window is configured by a base station.

In one subembodiment, the first signaling is a higher-layer signaling, and the second signaling is a physical layer signaling.

In one subembodiment, the first signaling is used for indicating a first spatial parameter group set associated with the first spatial parameter group; if the first spatial parameter group set includes the second spatial parameter group, the UE judges that the first time-frequency resource set can be used for transmitting a radio signal; if the first spatial parameter group set does not include the second spatial parameter group, the UE judges that the first time-frequency resource set cannot be used for transmitting a radio signal.

In one subembodiment, a third signaling is a higher-layer signaling.

In one subembodiment, a PDSCH is used for transmitting the third signaling.

In one subembodiment, the first spatial parameter group set includes the first spatial parameter group.

In one subembodiment, the first spatial parameter group is used for determining the first spatial parameter group set.

In one subembodiment, a reference signal resource identifier is used for determining a spatial parameter group.

In one subembodiment, the UE determines autonomously whether to transmit a radio signal in time-frequency resources in the first time-frequency resource pool.

In one subembodiment, the phrase that the UE determines autonomously refers that: if there is no data to transmit, the UE transmits a radio signal in time-frequency resources in the first time-frequency resource pool.

In one subembodiment, the phrase that the UE determines autonomously refers that: a base station serving the UE does not assume the UE must transmit a radio signal in time-frequency resources in the first time-frequency resource pool.

In one subembodiment, the phrase that the UE determines autonomously refers that: a base station serving the UE can determine, only after detection, that the UE transmits a radio signal in time-frequency resources in the first time-frequency resource pool.

In one subembodiment, the first spatial parameter group and the second spatial parameter group are associated with a first reference signal resource and a second reference signal resource respectively.

In one subembodiment, spatial parameter groups and reference signal resource identifiers are in one-to-one correspondence.

In one subembodiment, the first spatial parameter group is associated with a first synchronization signal time index, the second spatial parameter group is associated with a second synchronization signal time index, and a relationship between the first synchronization signal time index and the second synchronization signal time index is used for judging whether the first time-frequency resource set can be used for transmitting a radio signal.

In one subembodiment, if the first synchronization signal time index is the same as the second synchronization signal time index, the UE judges that the first time-frequency resource set can be used for transmitting a radio signal; if the first synchronization signal time index is different from the second synchronization signal time index, the UE judges that the first time-frequency resource set cannot be used for transmitting a radio signal.

In one subembodiment, if a difference between the first synchronization signal time index and the second synchronization signal time index is less than a second threshold, the UE judges that the first time-frequency resource set can be used for transmitting a radio signal; if a difference between the first synchronization signal time index and the second synchronization signal time index is not less than a second threshold, the UE judges that the first time-frequency resource set cannot be used for transmitting a radio signal.

In one subembodiment, a physical downlink shared channel is used for transmitting the first signaling, and a physical downlink control channel is used for transmitting the second signaling.

In one subembodiment, the UE has a requirement to transmit the first radio signal.

In one subembodiment, the first signaling is used for grant-free transmission, and the second signaling is used for grant based transmission.

In one subembodiment, the first signaling is terminal group specific, the terminal group includes multiple terminals, the UE is one terminal in the terminal group, and the second signaling is the UE specific.

Embodiment 2

Figure 2:
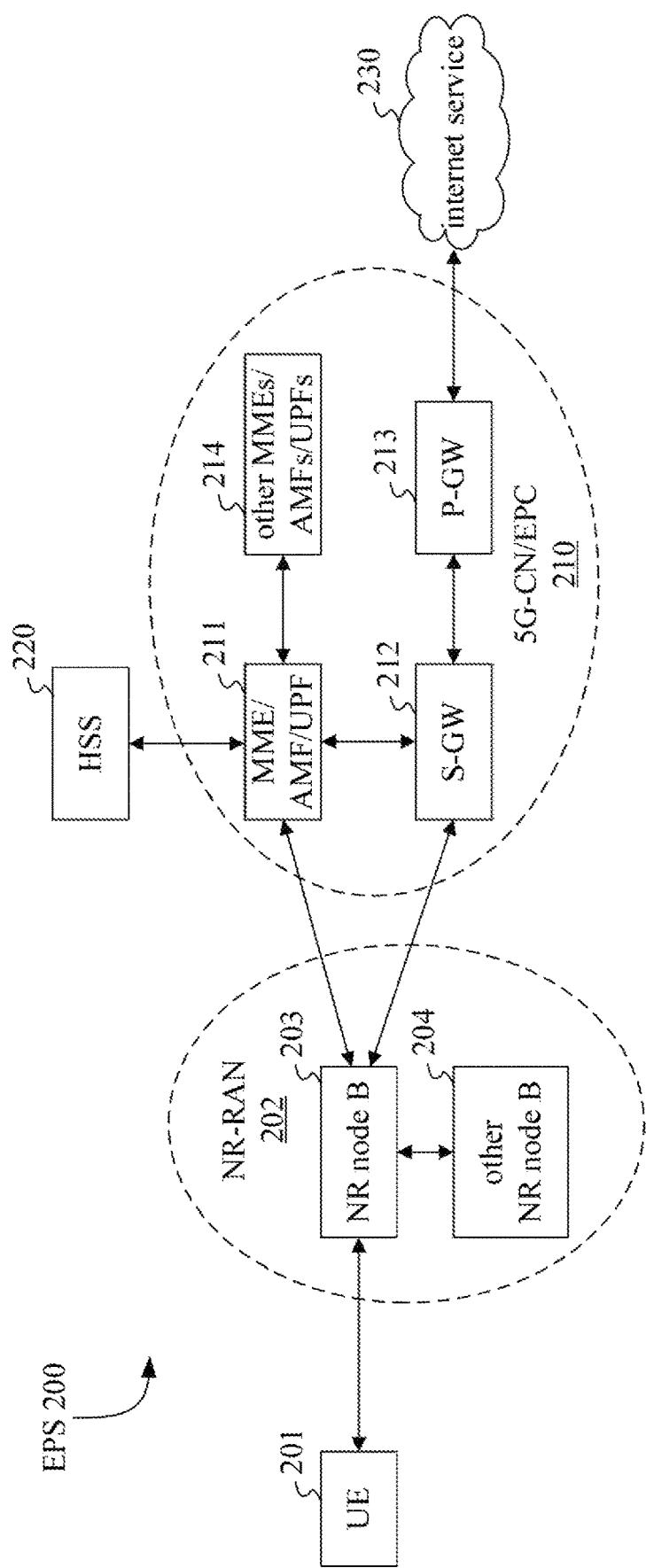
FIG. 2 is a diagram illustrating a network architecture according to one embodiment of the disclosure.

Embodiment 2 illustrates an example of a network architecture, as shown in FIG. 2.

Embodiment 2 illustrates an example of a diagram of a network architecture according to the disclosure, as shown in FIG. 2. FIG. 2 is a diagram illustrating a network architecture 200 of NR LTE and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, a 5G-Core Network/Evolved Packet Core (5G-CN/EPC) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistants (PDAs), satellite radios, non-territorial base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1/NG interface. The 5G-CN/EPC 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one subembodiment, the UE 201 corresponds to the UE in the disclosure.

In one subembodiment, the gNB 203 corresponds to the base station in the disclosure.

In one subembodiment, the UE 201 is a terminal which supports performing wireless communications on unlicensed spectrum.

In one subembodiment, the UE 201 is a terminal which supports grant-free transmission.

In one subembodiment, the UE 201 is a terminal which supports configured grant transmission.

In one subembodiment, the UE 201 is a terminal which supports beamforming.

In one subembodiment, the UE 201 is a terminal which supports narrow-band LBT.

In one subembodiment, the gNB 203 supports performing wireless communication on unlicensed spectrum.

In one subembodiment, the gNB 203 supports grant-free transmission.

In one subembodiment, the gNB 203 supports configured grant transmission.

In one subembodiment, the gNB 203 supports beamforming based uplink transmission.

Embodiment 3

Figure 3:
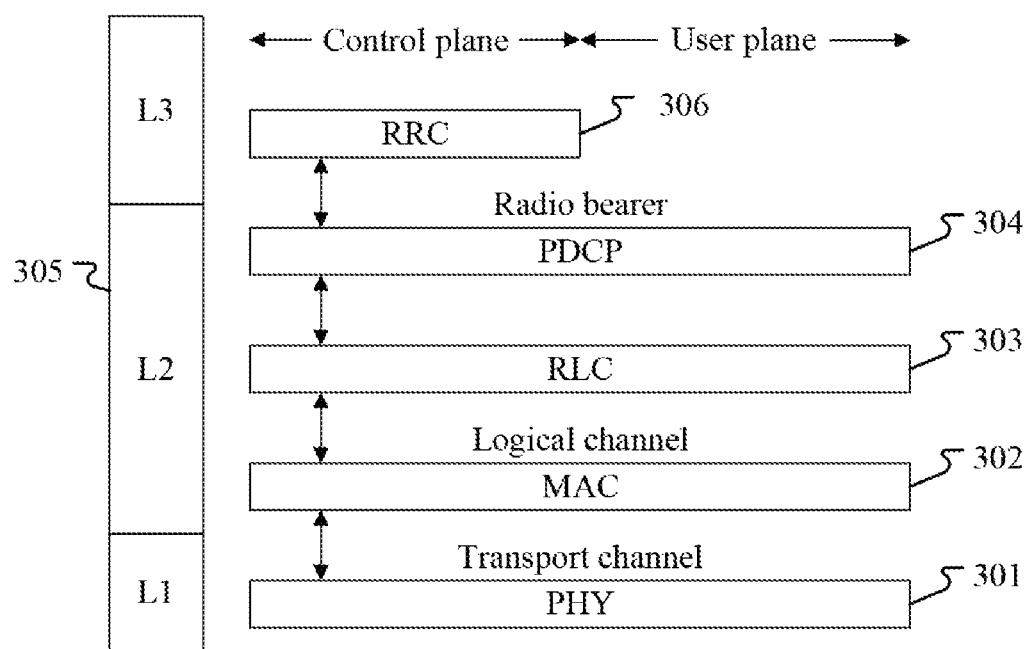
FIG. 3 is a diagram illustrating an embodiment of a radio protocol architecture of a user plane and a control plane according to one embodiment of the disclosure.

Embodiment 3 illustrates an example of a radio protocol architecture of a user plane and a control plane, as shown in FIG. 3.

FIG. 3 is a diagram illustrating an embodiment of a radio protocol architecture of a user plane and a control plane. In FIG. 3, the radio protocol architecture of a UE and a base station (gNB or eNB) is represented by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the UE and the gNB over the PHY 301. In the user plane, the L2 layer 305 includes a Medium Access Control (MAC) sublayer 302, a Radio Link Control (RLC) sublayer 303, and a Packet Data Convergence Protocol (PDCP) sublayer 304, which are terminated at the gNB on the network side. Although not shown in FIG. 3, the UE may include several higher layers above the L2 layer 305, including a network layer (i.e. IP layer) terminated at the P-GW on the network side and an application layer terminated at the other end (i.e. a peer UE, a server, etc.) of the connection. The PDCP sublayer 304 provides multiplexing between different radio bearers and logical channels. The PDCP sublayer 304 also provides header compression for higher-layer packets so as to reduce radio transmission overheads. The PDCP sublayer 304 provides security by encrypting packets and provides support for UE handover between gNBs. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among UEs. The MAC sublayer 302 is also in charge of HARQ operations. In the control plane, the radio protocol architecture of the UE and the gNB is almost the same as the radio protocol architecture in the user plane on the PHY 301 and the L2 layer 305, with the exception that there is no header compression function for the control plane. The control plane also includes a Radio Resource Control (RRC) sublayer 306 in the layer 3 (L3). The RRC sublayer 306 is responsible for acquiring radio resources (i.e. radio bearers) and configuring lower layers using an RRC signaling between the gNB and the UE.

In one subembodiment, the radio protocol architecture shown in FIG. 3 is applicable to the UE in the disclosure.

In one subembodiment, the radio protocol architecture shown in FIG. 3 is applicable to the base station in the disclosure.

In one subembodiment, the first signaling in the disclosure is generated by the RRC sublayer 306.

In one subembodiment, the second signaling in the disclosure is generated by the PHY 301.

In one subembodiment, the first radio signal in the disclosure is generated by the PDCP sublayer 304.

In one subembodiment, the second radio signal in the disclosure is generated by the PDCP sublayer 304.

Embodiment 4

Figure 4:
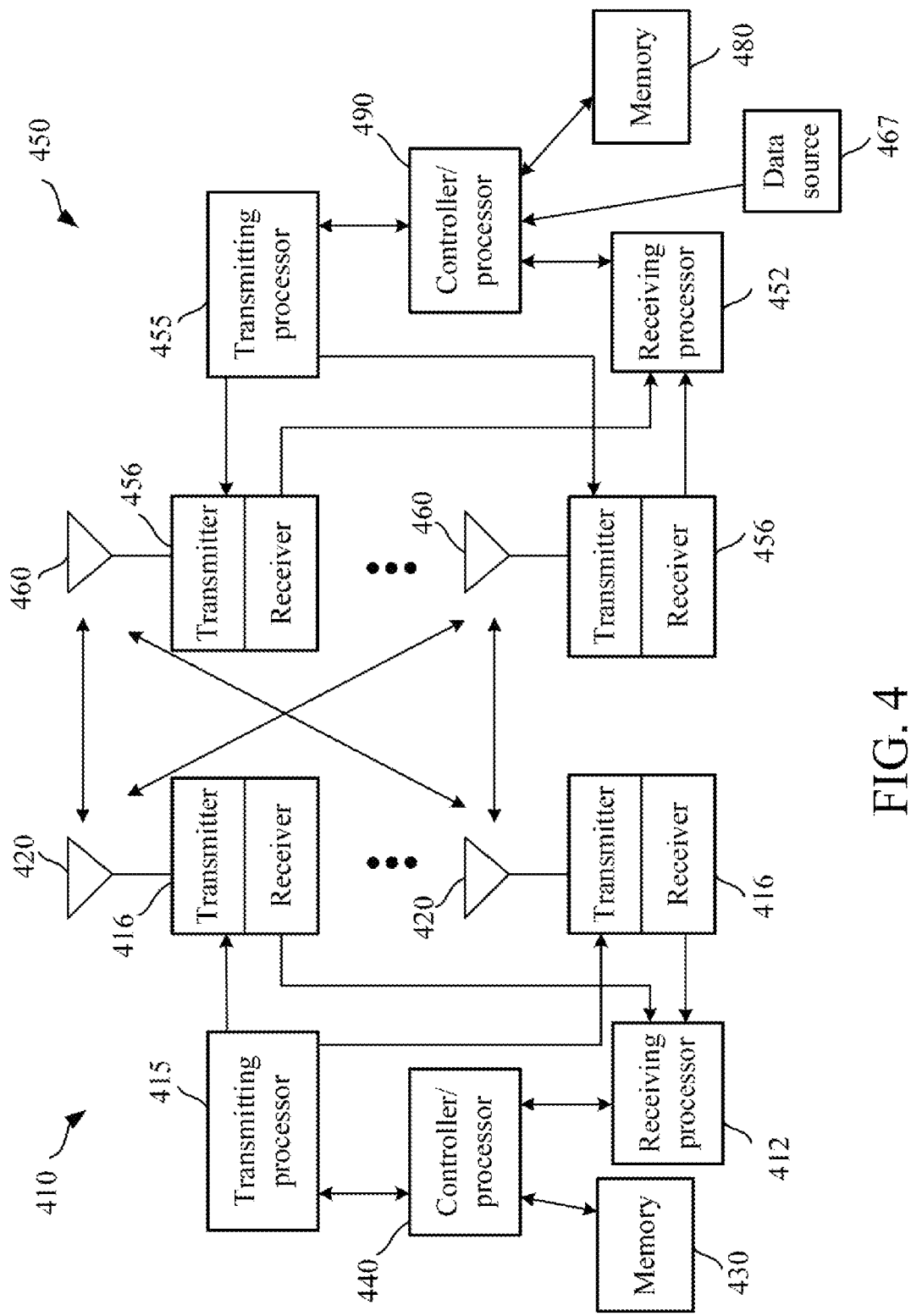
FIG. 4 is a diagram illustrating an evolved node B and a UE according to one embodiment of the disclosure.

Embodiment 4 illustrates an example of a base station and a UE, as shown in FIG. 4. FIG. 4 is a block diagram of a gNB 410 in communication with a UE 450 in an access network.

The base station 410 includes a controller/processor 440, a memory 430, a receiving processor 412, a transmitting processor 415, a transmitter/receiver 416 and an antenna 420.

The UE 450 includes a controller/processor 490, a memory 480, a data source 467, a transmitting processor 455, a receiving processor 452, a transmitter/receiver 456 and an antenna 460.

In Uplink (UL) transmission, processes relevant to the base station 410 include the following.

The receiver 416 receives a radio-frequency signal through the corresponding antenna 420, converts the received radio-frequency signal into a baseband signal, and provides the baseband signal to the receiving processor 412.

The receiving processor 412 performs various signal receiving processing functions of L1 layer (that is, PHY), including decoding, de-interleaving, descrambling, demodulation, extraction of physical layer control signalings, etc.

The receiving processor 412 performs various signal receiving processing functions of L1 layer (that is, PHY), including multi-antenna receiving, despreading, code division multiplexing, precoding, etc.

The controller/processor 440 performs functions of L2 layer, and is connected to the memory 430 that stores program codes and data.

The controller/processor 440 provides multiplexing between a transport channel and a logical channel, packet reassembling, decryption, header decompression, and control signal processing so as to recover a higher-layer packet coming from the UE 450. The higher-layer packet from the controller/processor 440 may be provided to a core network.

In UL transmission, processes relevant to the UE 450 include the following.

The data source 467 provides a higher-layer packet to the controller/processor 490. The data source 467 illustrates all protocol layers above L2 layer.

The transmitter 456 transmits a radio-frequency signal through the corresponding antenna 460, converts a baseband signal into a radio-frequency signal and provides the radio-frequency signal to the corresponding antenna 460.

The transmitting processor 455 performs various signal transmitting processing functions of L1 layer (that is, PHY), including encoding, interleaving, scrambling, modulation, generation of physical layer signalings, etc.

The transmitting processor 455 performs various signal transmitting processing functions of L1 layer (that is, PHY), including multi-antenna transmitting, spreading, code division multiplexing, precoding, etc.

The controller/processor 490 performs header compression, encryption, packet segmentation and reordering, and multiplexing between a logical channel and a transport channel based on the radio resource allocation of the gNB 410, and performs functions of L2 layer used for the user plane and the control plane.

The controller/processor 490 is also in charge of HARQ operation, retransmission of lost packets, and signalings to the eNB 410.

In Downlink (DL) transmission, processes relevant to the base station device 410 include the following.

A higher-layer packet is provided to the controller/processor 440. The controller/processor 440 provides header compression, encryption, packet segmentation and reordering, multiplexing and de-multiplexing between a logical channel and a transport channel, to implement the L2 protocol used for the user plane and the control plane. The higher-layer packet may include data or control information, for example, Downlink Shared Channel (DL-SCH).

The controller/processor 440 is connected to the memory 430 that stores program codes and data. The memory 430 may be a computer readable medium.

The controller/processor 440 includes a scheduling unit used for transmission requirements. The scheduling unit is configured to schedule air interface resources corresponding to transmission requirements.

The controller/processor 440 determines to transmit downlink signalings/data to be transmitted, and sends the result to the transmitting processor 415.

The transmitting processor 415 receives a bit stream output from the controller/processor 440, and performs various signal transmitting processing functions of L1 layer (that is, PHY), including encoding, interleaving, scrambling, modulation, precoding, power control/allocation, generation of physical layer control signalings (including PBCH, PDCCH, PHICH, PCFICH, reference signal), etc.

The transmitter 416 is configured to convert the baseband signal provided by the transmitting processor 415 into a radio-frequency signal and transmit the radio-frequency signal via the antenna 420. Each transmitter 416 performs sampling processing on respective input symbol streams to obtain respective sampled signal streams. Each transmitter 416 performs further processing (for example, digital-to-analogue conversion, amplification, filtering, up conversion, etc.) on respective sampled streams to obtain a downlink signal.

In DL transmission, processes relevant to the UE 450 include the following.

The receiver 456 is configured to convert a radio-frequency signal received via the antenna 460 into a baseband signal and provide the baseband signal to the receiving processor 452.

The receiving processor 452 performs various signal receiving processing functions of L1 layer (that is, PHY), including multi-antenna receiving, demodulation, descrambling, de-interleaving, decoding, and extraction of physical layer control signalings, etc.

The controller/processor 490 receives a bit stream output from the receiving processor 452, and provides header decompression, decryption, packet segmentation and reordering, multiplexing and de-multiplexing between a logical channel and a transport channel, to implement L2 protocols used for the user plane and the control plane.

The controller/processor 490 is connected to the memory 480 that stores program codes and data. The memory 480 may be a computer readable medium.

In one subembodiment, the UE 450 includes at least one processor and at least one memory. The at least one memory includes computer program codes. The at least one memory and the computer program codes are configured to be used in collaboration with the at least one processor. The UE 450 at least receives a first signaling, the first signaling being used for indicating a first time-frequency resource pool and a first spatial parameter group, the first spatial parameter group being associated to the first time-frequency resource pool, and the first time-frequency resource pool including a first time-frequency resource set; receives a second signaling, the second signaling being used for indicating a second spatial parameter group; and judges whether the first time-frequency resource set can be used for transmitting a radio signal; if so, transmits a first radio signal in the first time-frequency resource set, an antenna port used for transmitting the first radio signal being related to the first spatial parameter group; otherwise, gives up transmitting a radio signal in the first time-frequency resource set; wherein the first spatial parameter group and the second spatial parameter group are used for judging whether the first time-frequency resource set can be used for transmitting a radio signal.

In one embodiment, the UE 450 includes a memory that stores a computer readable instruction program. The computer readable instruction program generates an action when executed by at least one processor. The action includes: receiving a first signaling, the first signaling being used for indicating a first time-frequency resource pool and a first spatial parameter group, the first spatial parameter group being associated to the first time-frequency resource pool, and the first time-frequency resource pool including a first time-frequency resource set; receiving a second signaling, the second signaling being used for indicating a second spatial parameter group; and judging whether the first time-frequency resource set can be used for transmitting a radio signal; if so, transmitting a first radio signal in the first time-frequency resource set, an antenna port used for transmitting the first radio signal being related to the first spatial parameter group; otherwise, giving up transmitting a radio signal in the first time-frequency resource set; wherein the first spatial parameter group and the second spatial parameter group are used for judging whether the first time-frequency resource set can be used for transmitting a radio signal.

In one subembodiment, the gNB 410 device includes at least one processor and at least one memory. The at least one memory includes computer program codes. The at least one memory and the computer program codes are configured to be used in collaboration with the at least one processor. The gNB 410 at least transmits a first signaling, the first signaling being used for indicating a first time-frequency resource pool and a first spatial parameter group, the first spatial parameter group being associated to the first time-frequency resource pool, and the first time-frequency resource pool including a first time-frequency resource set; transmits a second signaling, the second signaling being used for indicating a second spatial parameter group; and detecting a first radio signal in the first time-frequency resource set, or, giving up detecting a first radio signal in the first time-frequency resource set; wherein the first spatial parameter group and the second spatial parameter group are used for indicating whether the first time-frequency resource set can be used for transmitting a radio signal.

In one subembodiment, the gNB 410 includes a memory that stores a computer readable instruction program. The computer readable instruction program generates an action when executed by at least one processor. The action includes transmitting a first signaling, the first signaling being used for indicating a first time-frequency resource pool and a first spatial parameter group, the first spatial parameter group being associated to the first time-frequency resource pool, and the first time-frequency resource pool including a first time-frequency resource set; transmitting a second signaling, the second signaling being used for indicating a second spatial parameter group; and detecting a first radio signal in the first time-frequency resource set, or, giving up detecting a first radio signal in the first time-frequency resource set; wherein the first spatial parameter group and the second spatial parameter group are used for indicating whether the first time-frequency resource set can be used for transmitting a radio signal.

In one subembodiment, the UE 450 corresponds to the UE in the present disclosure.

In one subembodiment, the gNB 410 corresponds to the base station in the present disclosure.

In one subembodiment, at least the former two of the receiver 456, the receiving processor 452 and the controller/processor 490 are used for receiving the first signaling in the disclosure.

In one subembodiment, at least the former two of the receiver 456, the receiving processor 452 and the controller/processor 490 are used for receiving the second signaling in the disclosure.

In one subembodiment, at least the former one of the transmitting processor 455 and the controller/processor 490 judges whether the first time-frequency resource set can be used for transmitting a radio signal.

In one subembodiment, at least the former two of the transmitter 456, the transmitting processor 455 and the controller/processor 490 transmit the first radio signal in the disclosure.

In one subembodiment, at least the former two of the transmitter 416, the transmitting processor 415 and the controller/processor 440 are used for transmitting the first signaling in the disclosure.

In one subembodiment, at least the former two of the transmitter 416, the transmitting processor 415 and the controller/processor 440 are used for transmitting the second signaling in the disclosure.

In one subembodiment, at least the former two of the receiver 416, the receiving processor 412 and the controller/processor 440 are used for monitoring the first radio signal in the disclosure.

Embodiment 5

Figure 5:
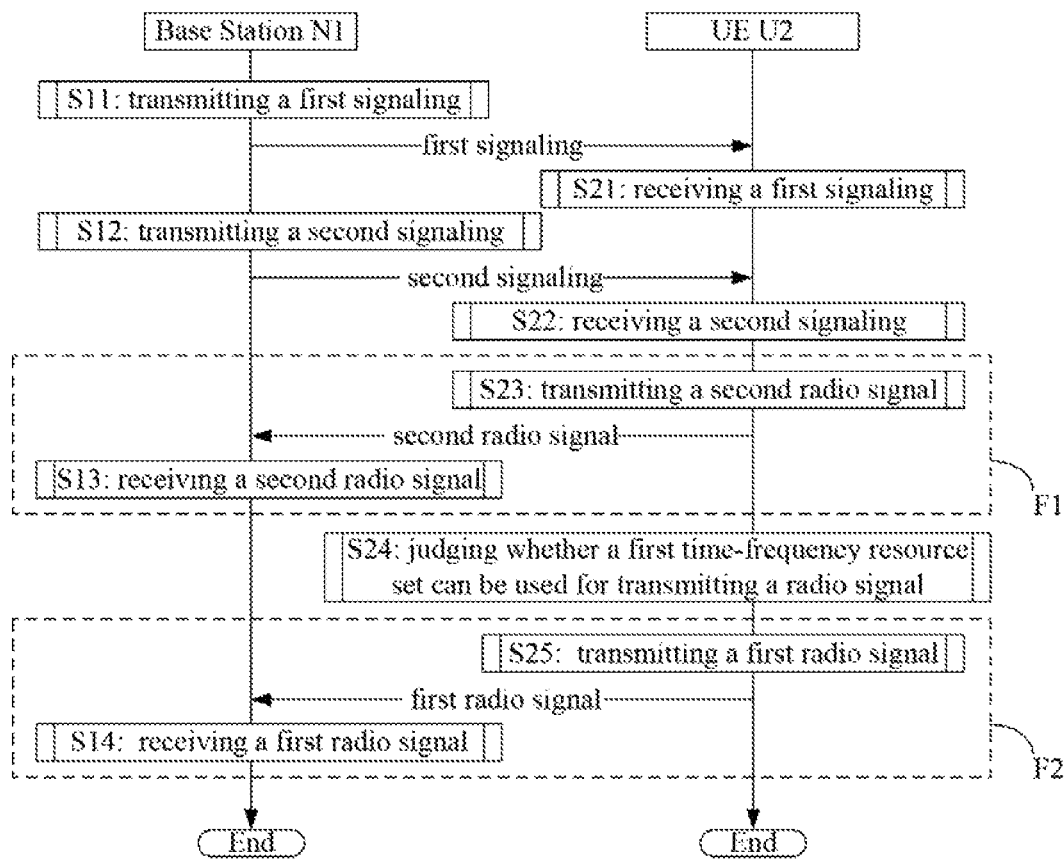
FIG. 5 is a flowchart of wireless transmission according to one embodiment of the disclosure.

Embodiment 5 illustrates an example of a flowchart of wireless transmission, as shown in FIG. 5. In FIG. 5, a base station N1 is a maintenance base station for a serving cell of a UE U2. In FIG. 5, steps in box F1 and box F2 are optional.

The base station N1 transmits a first signaling in S11, transmits a second signaling in S12, receives a second radio signal in S13, and receives a first radio signal in S14.

The UE U2 receives a first signaling in S21, receives a second signaling in S22, transmits a second radio signal in S23, judges whether a first time-frequency resource set can be used for transmitting a radio signal in S24, and transmits a first radio signal in S25.

In Embodiment 5, the first signaling is used by the N1 to indicate a first time-frequency resource pool and a first spatial parameter group, the first spatial parameter group is associated to the first time-frequency resource pool, and the first time-frequency resource pool includes a first time-frequency resource set; the second signaling is used by the N1 to indicate a second spatial parameter group; the U2 judges whether the first time-frequency resource set can be used for transmitting a radio signal; if so, the step in box F2 exists, the U2 transmits a first radio signal in the first time-frequency resource set, an antenna port used for transmitting the first radio signal being related to the first spatial parameter group; otherwise, the U2 gives up transmitting a radio signal in the first time-frequency resource set; the N1 monitors a first radio signal in the first time-frequency resource set, or gives up monitoring a radio signal in the first time-frequency resource set; the first spatial parameter group and the second spatial parameter group are used by the U2 to judge whether the first time-frequency resource set can be used for transmitting a radio signal.

In one subembodiment, the step in box F1 exists, an antenna port used by the U2 to transmit the second radio signal is related to the second spatial parameter group, and time-frequency resources in the second time-frequency resource set do not belong to the first time-frequency resource pool; wherein the second signaling includes scheduling information of the second radio signal.

In one subembodiment, the first time-frequency resource set is within a first time window, and a reception time point of the second signaling is used for determining an end time point of the first time window.

In one subembodiment, the first signaling is a higher-layer signaling, and the second signaling is a physical layer signaling.

In one subembodiment, the first signaling is used by the N1 to indicate a first spatial parameter group set associated with the first spatial parameter group; if the first spatial parameter group set includes the second spatial parameter group, the U2 judges that the first time-frequency resource set can be used for transmitting a radio signal; if the first spatial parameter group set does not include the second spatial parameter group, the U2 judges that the first time-frequency resource set cannot be used for transmitting a radio signal.

In one subembodiment, the U2 determines autonomously whether to transmit a radio signal in time-frequency resources in the first time-frequency resource pool.

In one subembodiment, the first spatial parameter group and the second spatial parameter group are associated with a first reference signal resource and a second reference signal resource respectively.

In one subembodiment, the first spatial parameter group is associated with a first synchronization signal time index, the second spatial parameter group is associated with a second synchronization signal time index, and a relationship between the first synchronization signal time index and the second synchronization signal time index is used by the U2 to judge whether the first time-frequency resource set can be used for transmitting a radio signal.

In one subembodiment, a physical downlink shared channel is used for transmitting the first signaling, and a physical downlink control channel is used for transmitting the second signaling.

Embodiment 6

Figure 6:
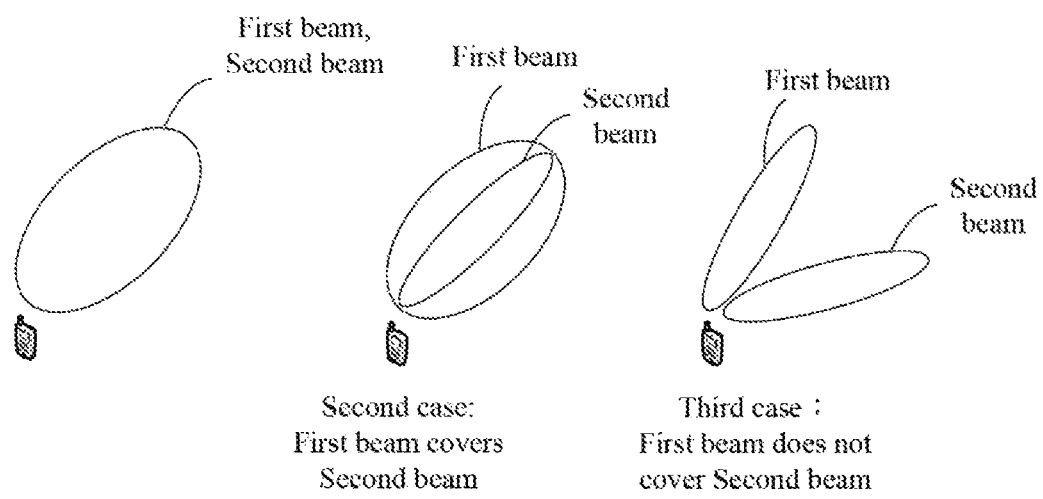
FIG. 6 is a diagram illustrating a first spatial parameter group and a second spatial parameter group according to one embodiment of the disclosure.

Embodiment 6 illustrates an example of a diagram of a first spatial parameter group and a second spatial parameter group, as shown in FIG. 6.

In Embodiment 6, the first spatial parameter group and the second spatial parameter group are used for generating a first beam and a second beam respectively. The first beam and the second beam are used for transmitting the first radio signal and the second radio signal in the disclosure respectively. In FIG. 6, three relative relationships in space between the first beam and the second beam are illustrated. In a first case, the first beam is the same as the second beam. In a second case, the first beam covers the second beam. In a third case, the first beam does not cover the second beam. In the first case and the second case, the UE in the disclosure judges that the first time-frequency resource set can be used for transmitting a radio signal. In the third case, the UE in the disclosure judges that the first time-frequency resource set cannot be used for transmitting a radio signal.

Embodiment 7

Figure 7:
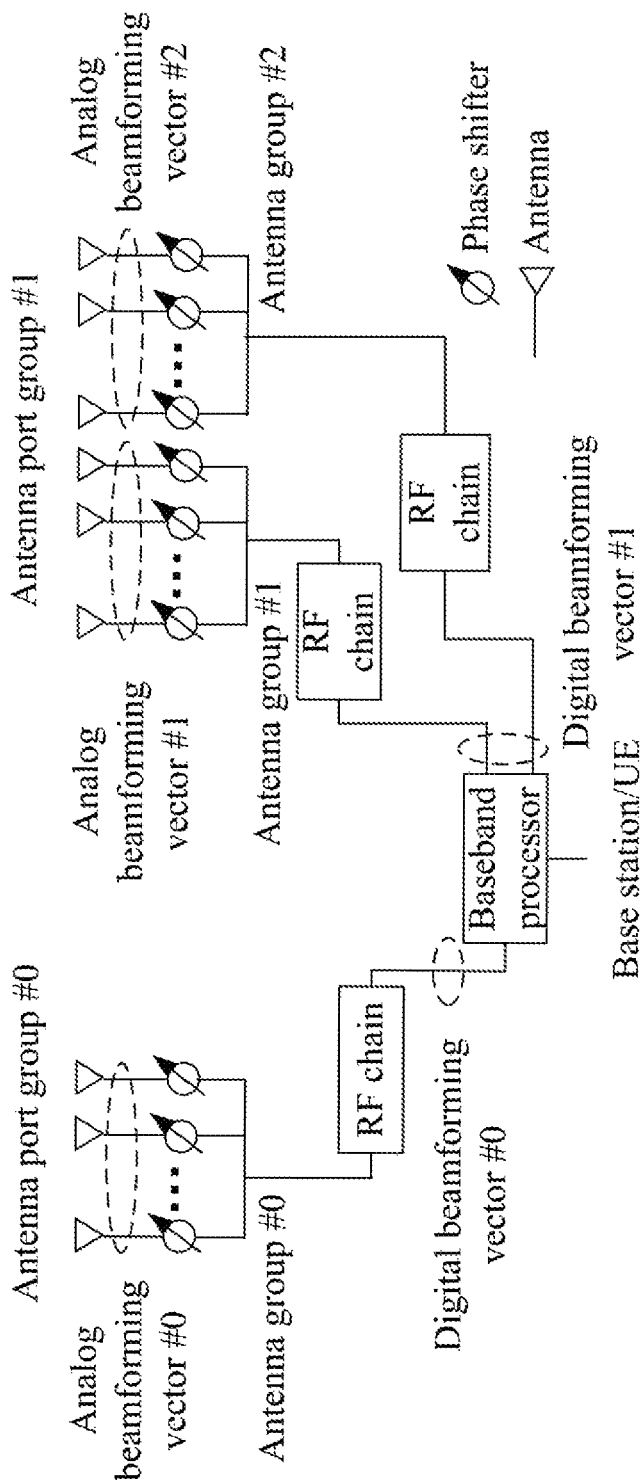
FIG. 7 is a diagram illustrating an antenna port group used for transmitting a radio signal according to one embodiment of the disclosure.

Embodiment 7 illustrates an example of a diagram of an antenna port group used for transmitting a radio signal, as shown in FIG. 7.

In Embodiment 7, one antenna port group includes a positive integer number of antenna ports; one antenna port is formed by antennas in a positive integer number of antenna groups through antenna virtualization superposition; one antenna group includes a positive integer number of antennas. One antenna group is connected to a baseband processor through one Radio Frequency (RF) chain, and different antenna groups correspond to different RF chains. Mapping coefficients from all antennas in a positive integer number of antenna groups included in a given antenna port to the given antenna port constitute a beamforming vector corresponding to the given antenna port. Mapping coefficients from multiple antennas included in any one given antenna group among a positive integer number of antenna groups included in the given antenna port to the given antenna port constitute an analog beamforming vector of the given antenna group. Analog beamforming vectors corresponding to the positive integer number of antenna groups are diagonally arranged to form an analog beamforming matrix corresponding to the given antenna port. Mapping coefficients from the positive integer number of antenna groups to the given antenna port constitute a digital beamforming vector corresponding to the given antenna port. The beamforming vector corresponding to the given antenna port is obtained by a product of the analog beamforming matrix and the digital beamforming vector corresponding to the given antenna port. Different antenna ports in one antenna port group are formed by same antenna group(s), and different antenna ports in one same antenna port group correspond to different beamforming vectors.

FIG. 7 illustrates two antenna port groups, that is, an antenna port group #0 and an antenna port group #1, wherein the antenna port group #0 is formed by an antenna group #0, the antenna port group #1 is formed by an antenna group #1 and an antenna group #2. Mapping coefficients from multiple antennas in the antenna group #0 to the antenna port group #0 constitute an analog beamforming vector #0, a mapping coefficient from the antenna group #0 to the antenna port group #0 constitutes a digital beamforming vector #0. Mapping coefficients from multiple antennas in the antenna group #1 and multiple antennas in the antenna group #2 to the antenna port group #1 constitute an analog beamforming vector #1 and an analog beamforming vector #2 respectively. Mapping coefficients from the antenna group #1 and the antenna group #2 to the antenna port group #1 constitute a digital beamforming vector #1. A beamforming vector corresponding to any one antenna port in the antenna port group #0 is obtained by a product of the analog beamforming vector #0 and the digital beamforming vector #0. A beamforming vector corresponding to any one antenna port in the antenna port group #1 is obtained by a product of an analog beamforming matrix, which is formed by diagonal arrangement of the analog beamforming vector #1 and the analog beamforming vector #2, and the digital beamforming vector #1.

In one subembodiment, one antenna port group includes one antenna port. For example, the antenna port group #0 illustrated in FIG. 7 includes one antenna port.

In one affiliated embodiment of the above subembodiment, an analog beamforming matrix corresponding to the one antenna port is dimensionally reduced to an analog beamforming vector, a digital beamforming vector corresponding to the one antenna port is dimensionally reduced to one scalar, and a beamforming vector corresponding to the one antenna port is equal to the analog beamforming vector of the one antenna port.

In one subembodiment, one antenna port group includes multiple antenna ports.

In one affiliated embodiment of the above subembodiment, the multiple antenna ports correspond to a same analog beamforming matrix and different digital beamforming vectors.

In one subembodiment, antenna ports in different antenna port groups correspond to different analog beamforming matrixes.

Embodiment 8

Figure 8:
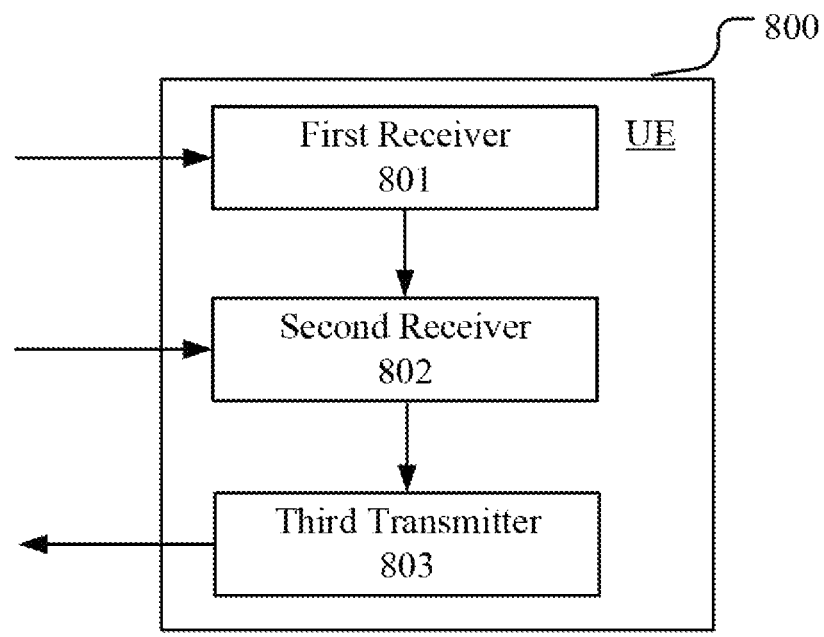
FIG. 8 is a structure block diagram illustrating a processing device in a UE according to one embodiment of the disclosure.

Embodiment 8 illustrates an example of a structure block diagram of a processing device in a UE, as shown in FIG. 8. In FIG. 8, the processing device 800 in the UE is mainly composed of a first receiver 801, a second receiver 802 and a third transmitter 803.

The first receiver 801 receives a first signaling.

The second receiver 802 receives a second signaling.

The third transmitter 803 judges whether the first time-frequency resource set can be used for transmitting a radio signal.

In Embodiment 8, the first signaling is used for indicating a first time-frequency resource pool and a first spatial parameter group, the first spatial parameter group is associated to the first time-frequency resource pool, and the first time-frequency resource pool includes a first time-frequency resource set; the second signaling is used for indicating a second spatial parameter group; and the third transmitter 803 judges whether the first time-frequency resource set can be used for transmitting a radio signal; if so, the third transmitter 803 transmits a first radio signal in the first time-frequency resource set, an antenna port used for transmitting the first radio signal being related to the first spatial parameter group; otherwise, the third transmitter 803 gives up transmitting a radio signal in the first time-frequency resource set; wherein the first spatial parameter group and the second spatial parameter group are used for judging whether the first time-frequency resource set can be used for transmitting a radio signal.

In one subembodiment, the third transmitter 803 transmits a second radio signal in a second time-frequency resource set, an antenna port used for transmitting the second radio signal is related to the second spatial parameter group, and time-frequency resources in the second time-frequency resource set do not belong to the first time-frequency resource pool, wherein the second signaling includes scheduling information of the second radio signal.

In one subembodiment, the first time-frequency resource set is within a first time window, and a reception time point of the second signaling is used for determining an end time point of the first time window.

In one subembodiment, the first signaling is a higher-layer signaling, and the second signaling is a physical layer signaling.

In one subembodiment, the first signaling is used for indicating a first spatial parameter group set associated with the first spatial parameter group; if the first spatial parameter group set includes the second spatial parameter group, the UE judges that the first time-frequency resource set can be used for transmitting a radio signal; if the first spatial parameter group set does not include the second spatial parameter group, the UE judges that the first time-frequency resource set cannot be used for transmitting a radio signal.

In one subembodiment, the UE determines autonomously whether to transmit a radio signal in time-frequency resources in the first time-frequency resource pool.

In one subembodiment, the first spatial parameter group and the second spatial parameter group are associated with a first reference signal resource and a second reference signal resource respectively.

In one subembodiment, the first spatial parameter group is associated with a first synchronization signal time index, the second spatial parameter group is associated with a second synchronization signal time index, and a relationship between the first synchronization signal time index and the second synchronization signal time index is used for judging whether the first time-frequency resource set can be used for transmitting a radio signal.

In one subembodiment, a physical downlink shared channel is used for transmitting the first signaling, and a physical downlink control channel is used for transmitting the second signaling.

In one subembodiment, the first receiver 801 includes at least the former two of the receiver 456, the receiving processor 452 and the controller/processor 490 mentioned in Embodiment 4.

In one subembodiment, the second receiver 802 includes at least the former two of the receiver 456, the receiving processor 452 and the controller/processor 490 mentioned in Embodiment 4.

In one subembodiment, the third transmitter 803 includes at least the former two of the transmitter 456, the transmitting processor 455 and the controller/processor 490 mentioned in Embodiment 4.

Embodiment 9

Figure 9:
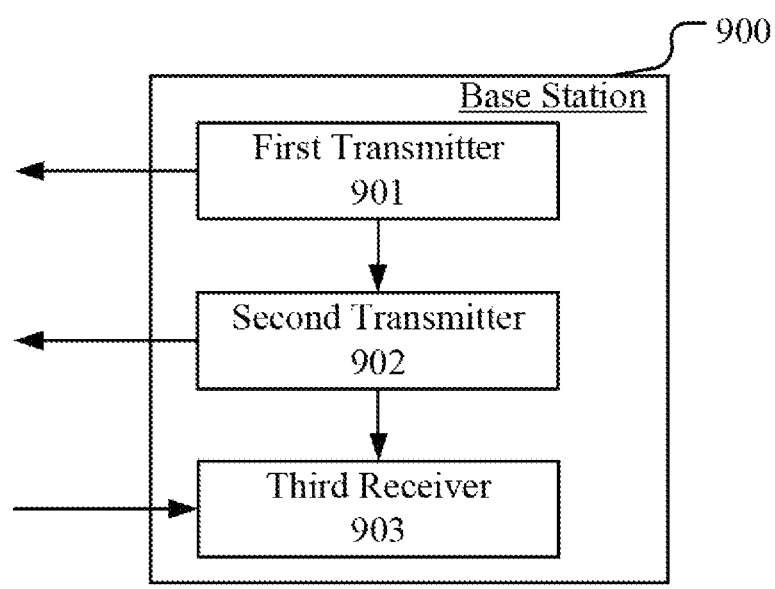
FIG. 9 is a structure block diagram illustrating a processing device in a base station according to one embodiment of the disclosure.

Embodiment 9 illustrates an example of a structure block diagram of a processing device in a base station, as shown in FIG. 9. In FIG. 9, the processing device 900 in the base station is mainly composed of a first transmitter 901, a second transmitter 902 and a third receiver 903.

The first transmitter 901 transmits a first signaling.

The second transmitter 902 transmits a second signaling.

The third receiver 903 monitors a first radio signal in the first time-frequency resource set, or, to gives up monitoring a radio signal in the first time-frequency resource set.

In Embodiment 9, the first signaling is used for indicating a first time-frequency resource pool and a first spatial parameter group, the first spatial parameter group is associated to the first time-frequency resource pool, and the first time-frequency resource pool includes a first time-frequency resource set; a second signaling is transmitted, and the second signaling is used for indicating a second spatial parameter group; and the first spatial parameter group and the second spatial parameter group are used for indicating whether the first time-frequency resource set can be used for transmitting a radio signal.

In one subembodiment, the third receiver 903 receives a second radio signal in a second time-frequency resource set, an antenna port used for transmitting the second radio signal is related to the second spatial parameter group, and time-frequency resources in the second time-frequency resource set do not belong to the first time-frequency resource pool, wherein the second signaling includes scheduling information of the second radio signal.

In one subembodiment, the first time-frequency resource set is within a first time window, and a reception time point of the second signaling is used for determining an end time point of the first time window.

In one subembodiment, the first signaling is a higher-layer signaling, and the second signaling is a physical layer signaling.

In one subembodiment, the first signaling is used for indicating a first spatial parameter group set associated with the first spatial parameter group; if the first spatial parameter group set includes the second spatial parameter group, the first time-frequency resource set can be used for transmitting a radio signal; if the first spatial parameter group set does not include the second spatial parameter group, the first time-frequency resource set cannot be used for transmitting a radio signal.

In one subembodiment, a receiver of the first signaling determines autonomously whether to transmit a radio signal in time-frequency resources in the first time-frequency resource pool.

In one subembodiment, the first spatial parameter group and the second spatial parameter group are associated with a first reference signal resource and a second reference signal resource respectively.

In one subembodiment, the first spatial parameter group is associated with a first synchronization signal time index, the second spatial parameter group is associated with a second synchronization signal time index, and a relationship between the first synchronization signal time index and the second synchronization signal time index is used for judging whether the first time-frequency resource set can be used for transmitting a radio signal.

In one subembodiment, a physical downlink shared channel is used for transmitting the first signaling, and a physical downlink control channel is used for transmitting the second signaling.

In one subembodiment, the first transmitter 901 includes at least the former two of the transmitter 416, the transmitting processor 415 and the controller/processor 440 mentioned in Embodiment 4.

In one subembodiment, the second transmitter 902 includes at least the former two of the transmitter 416, the transmitting processor 415 and the controller/processor 440 mentioned in Embodiment 4.

In one subembodiment, the third receiver 903 includes at least the former two of the receiver 416, the receiving processor 412 and the controller/processor 440 mentioned in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the present disclosure includes but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the present application includes but not limited to macro-cellular base stations, micro-cellular base stations, home base stations, relay base station, gNB (NR node B), TRP, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for wireless communication, comprising:
    receiving a first signaling, the first signaling being used for indicating a first time-frequency resource pool and a first spatial parameter group, the first spatial parameter group being associated to the first time-frequency resource pool, and the first time-frequency resource pool comprising a first time-frequency resource set;
    receiving a second signaling, the second signaling being used for indicating a second spatial parameter group; and
    judging whether the first time-frequency resource set can be used for transmitting a radio signal; if so, transmitting a first radio signal in the first time-frequency resource set, an antenna port used for transmitting the first radio signal being related to the first spatial parameter group; otherwise, giving up transmitting a radio signal in the first time-frequency resource set;
    wherein the first spatial parameter group and the second spatial parameter group are used for judging whether the first time-frequency resource set can be used for transmitting a radio signal.

2. The method according to claim 1, comprising:
    transmitting a second radio signal in a second time-frequency resource set, an antenna port used for transmitting the second radio signal being related to the second spatial parameter group, and time-frequency resources in the second time-frequency resource set not belonging to the first time-frequency resource pool,
    wherein the second signaling comprises scheduling information of the second radio signal;
    or, the first time-frequency resource set is within a first time window, and a reception time point of the second signaling is used for determining an end time point of the first time window.

3. The method according to claim 1, wherein the first signaling is a higher-layer signaling, and the second signaling is a physical layer signaling;
    or, a physical downlink shared channel is used for transmitting the first signaling, and a physical downlink control channel is used for transmitting the second signaling.

4. The method according to claim 1, wherein the first signaling is used for indicating a first spatial parameter group set associated with the first spatial parameter group, if the first spatial parameter group set comprises the second spatial parameter group, the UE judges that the first time-frequency resource set can be used for transmitting a radio signal, if the first spatial parameter group set does not comprise the second spatial parameter group, the UE judges that the first time-frequency resource set cannot be used for transmitting a radio signal;
    or, the first spatial parameter group is associated with a first synchronization signal time index, the second spatial parameter group is associated with a second synchronization signal time index, and a relationship between the first synchronization signal time index and the second synchronization signal time index is used for judging whether the first time-frequency resource set can be used for transmitting a radio signal.

5. The method according to claim 1, wherein the UE determines autonomously whether to transmit a radio signal in time-frequency resources in the first time-frequency resource pool;
    or, the first spatial parameter group and the second spatial parameter group are associated with a first reference signal resource and a second reference signal resource respectively.

6. A method in a base station for wireless communication, comprising:
    transmitting a first signaling, the first signaling being used for indicating a first time-frequency resource pool and a first spatial parameter group, the first spatial parameter group being associated to the first time-frequency resource pool, and the first time-frequency resource pool comprising a first time-frequency resource set;
    transmitting a second signaling, the second signaling being used for indicating a second spatial parameter group; and
    monitoring a first radio signal in the first time-frequency resource set, or, giving up monitoring a radio signal in the first time-frequency resource set;
    wherein the first spatial parameter group and the second spatial parameter group are used for indicating whether the first time-frequency resource set can be used for transmitting a radio signal.

7. The method according to claim 6, comprising:
    receiving a second radio signal in a second time-frequency resource set, an antenna port used for transmitting the second radio signal being related to the second spatial parameter group, and time-frequency resources in the second time-frequency resource set not belonging to the first time-frequency resource pool,
    wherein the second signaling comprises scheduling information of the second radio signal;
    or, the first time-frequency resource set is within a first time window, and a reception time point of the second signaling is used for determining an end time point of the first time window.

8. The method according to claim 6, wherein the first signaling is a higher-layer signaling, and the second signaling is a physical layer signaling;
    or, a physical downlink shared channel is used for transmitting the first signaling, and a physical downlink control channel is used for transmitting the second signaling.

9. The method according to claim 6, wherein the first signaling is used for indicating a first spatial parameter group set associated with the first spatial parameter group, if the first spatial parameter group set comprises the second spatial parameter group, the first time-frequency resource set can be used for transmitting a radio signal, if the first spatial parameter group set does not comprise the second spatial parameter group, the first time-frequency resource set cannot be used for transmitting a radio signal;

or, the first spatial parameter group is associated with a first synchronization signal time index, the second spatial parameter group is associated with a second synchronization signal time index, and a relationship between the first synchronization signal time index and the second synchronization signal time index is used for judging whether the first time-frequency resource set can be used for transmitting a radio signal.

10. The method according to claim 6, wherein a receiver of the first signaling determines autonomously whether to transmit a radio signal in time-frequency resources in the first time-frequency resource pool;

or, the first spatial parameter group and the second spatial parameter group are associated with a first reference signal resource and a second reference signal resource respectively.

11. A UE for wireless communication, comprising:
a first receiver, to receive a first signaling, the first signaling being used for indicating a first time-frequency resource pool and a first spatial parameter group, the first spatial parameter group being associated to the first time-frequency resource pool, and the first time-frequency resource pool comprising a first time-frequency resource set;
a second receiver, to receive a second signaling, the second signaling being used for indicating a second spatial parameter group; and
a third transmitter, to judge whether the first time-frequency resource set can be used for transmitting a radio signal; if so, to transmit a first radio signal in the first time-frequency resource set, an antenna port used for transmitting the first radio signal being related to the first spatial parameter group; otherwise, to give up transmitting a first radio signal in the first time-frequency resource set;
wherein the first spatial parameter group and the second spatial parameter group are used for judging whether the first time-frequency resource set can be used for transmitting a radio signal.

12. The UE according to claim 11, wherein the third transmitter transmits a second radio signal in a second time-frequency resource set, an antenna port used for transmitting the second radio signal is related to the second spatial parameter group, and time-frequency resources in the second time-frequency resource set do not belong to the first time-frequency resource pool, wherein the second signaling comprises scheduling information of the second radio signal;

or, the first time-frequency resource set is within a first time window, and a reception time point of the second signaling is used for determining an end time point of the first time window.

13. The UE according to claim 11, wherein the first signaling is a higher-layer signaling, and the second signaling is a physical layer signaling;

or, a physical downlink shared channel is used for transmitting the first signaling, and a physical downlink control channel is used for transmitting the second signaling.

14. The UE according to claim 11, wherein the first signaling is used for indicating a first spatial parameter group set associated with the first spatial parameter group, if the first spatial parameter group set comprises the second spatial parameter group, the UE judges that the first time-frequency resource set can be used for transmitting a radio signal, if the first spatial parameter group set does not comprise the second spatial parameter group, the UE judges that the first time-frequency resource set cannot be used for transmitting a radio signal;

or, the first spatial parameter group is associated with a first synchronization signal time index, the second spatial parameter group is associated with a second synchronization signal time index, and a relationship between the first synchronization signal time index and the second synchronization signal time index is used for judging whether the first time-frequency resource set can be used for transmitting a radio signal.

15. The UE according to claim 11, wherein the UE determines autonomously whether to transmit a radio signal in time-frequency resources in the first time-frequency resource pool;

or, the first spatial parameter group and the second spatial parameter group are associated with a first reference signal resource and a second reference signal resource respectively.

16. A base station for wireless communication, comprising:
a first transmitter, to transmit a first signaling, the first signaling being used for indicating a first time-frequency resource pool and a first spatial parameter group, the first spatial parameter group being associated to the first time-frequency resource pool, and the first time-frequency resource pool comprising a first time-frequency resource set;
a second transmitter, to transmit a second signaling, the second signaling being used for indicating a second spatial parameter group; and
a third receiver, to monitor a first radio signal in the first time-frequency resource set, or, to give up monitoring a radio signal in the first time-frequency resource set;
wherein the first spatial parameter group and the second spatial parameter group are used for indicating whether the first time-frequency resource set can be used for transmitting a radio signal.

17. The base station according to claim 16, wherein the third receiver receives a second radio signal in a second time-frequency resource set, an antenna port used for transmitting the second radio signal is related to the second spatial parameter group, and time-frequency resources in the second time-frequency resource set do not belong to the first time-frequency resource pool, wherein the second signaling comprises scheduling information of the second radio signal;

or, the first time-frequency resource set is within a first time window, and a reception time point of the second signaling is used for determining an end time point of the first time window.

18. The base station according to claim 16, wherein the first signaling is a higher-layer signaling, and the second signaling is a physical layer signaling;

or, a physical downlink shared channel is used for transmitting the first signaling, and a physical downlink control channel is used for transmitting the second signaling.

19. The base station according to claim 16, wherein the first signaling is used for indicating a first spatial parameter group set associated with the first spatial parameter group, if the first spatial parameter group set comprises the second spatial parameter group, the first time-frequency resource set can be used for transmitting a radio signal, if the first spatial parameter group set does not comprise the second spatial parameter group, the first time-frequency resource set cannot be used for transmitting a radio signal;

or, the first spatial parameter group is associated with a first synchronization signal time index, the second spatial parameter group is associated with a second synchronization signal time index, and a relationship between the first synchronization signal time index and the second synchronization signal time index is used for judging whether the first time-frequency resource set can be used for transmitting a radio signal.

20. The base station according to claim 16, wherein a receiver of the first signaling determines autonomously whether to transmit a radio signal in time-frequency resources in the first time-frequency resource pool;

or, the first spatial parameter group and the second spatial parameter group are associated with a first reference signal resource and a second reference signal resource respectively.

* * * * *